July 4, 1967    R. CRIMELLA    3,328,816
AUTOMATIC MACHINE FOR TURNING FOOTWEAR INSIDE OUT
Filed June 17, 1965    10 Sheets-Sheet 10

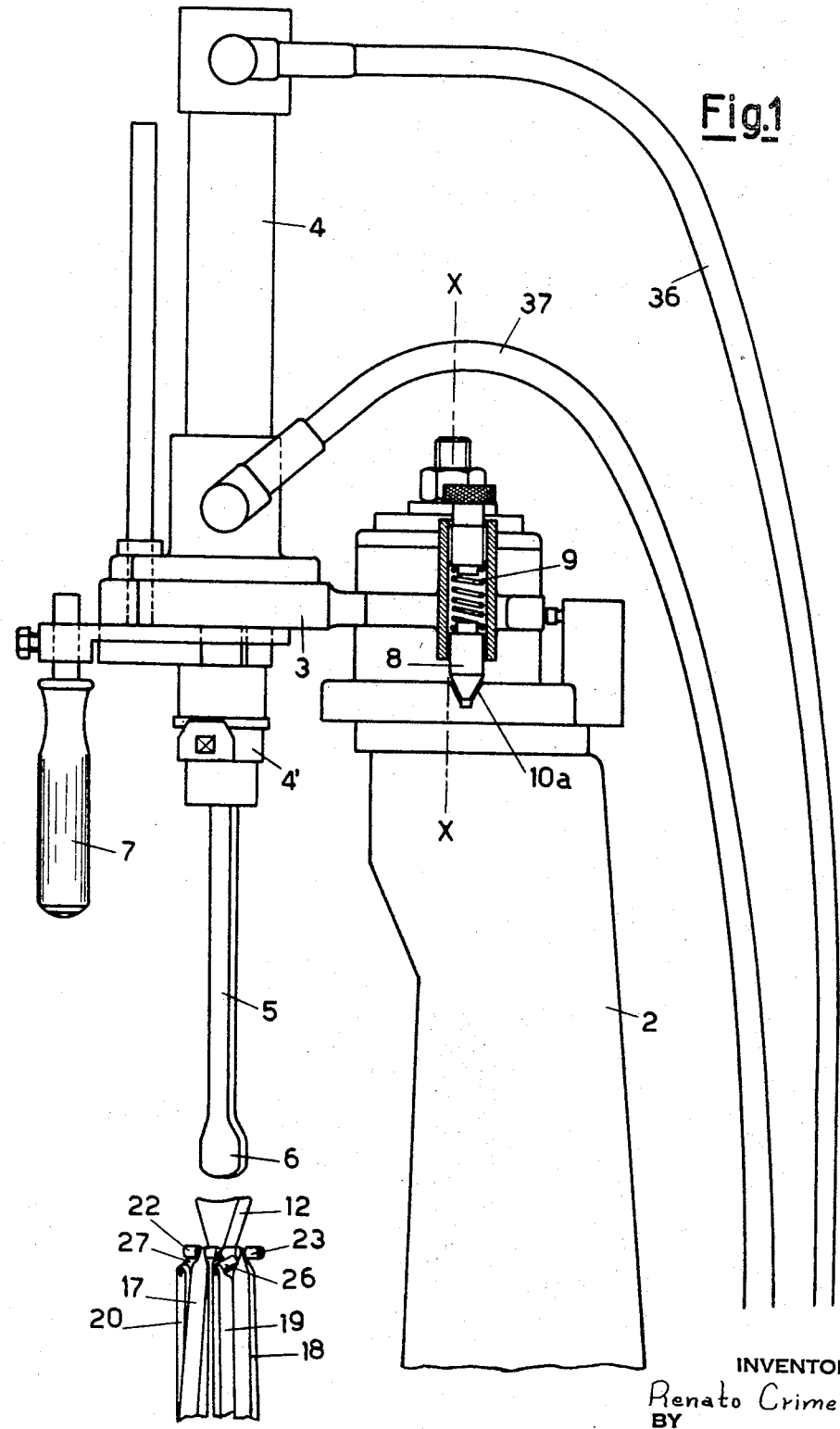

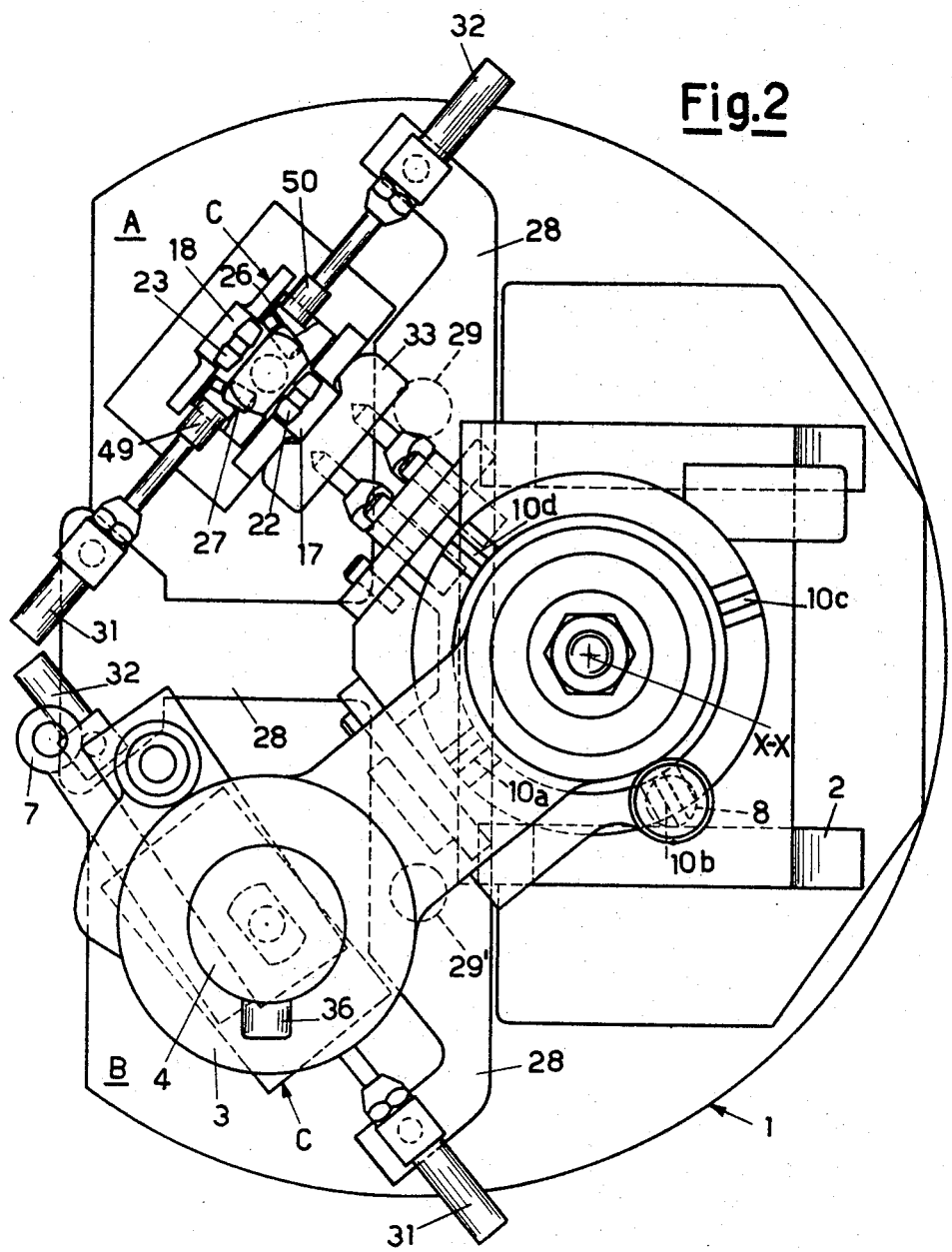

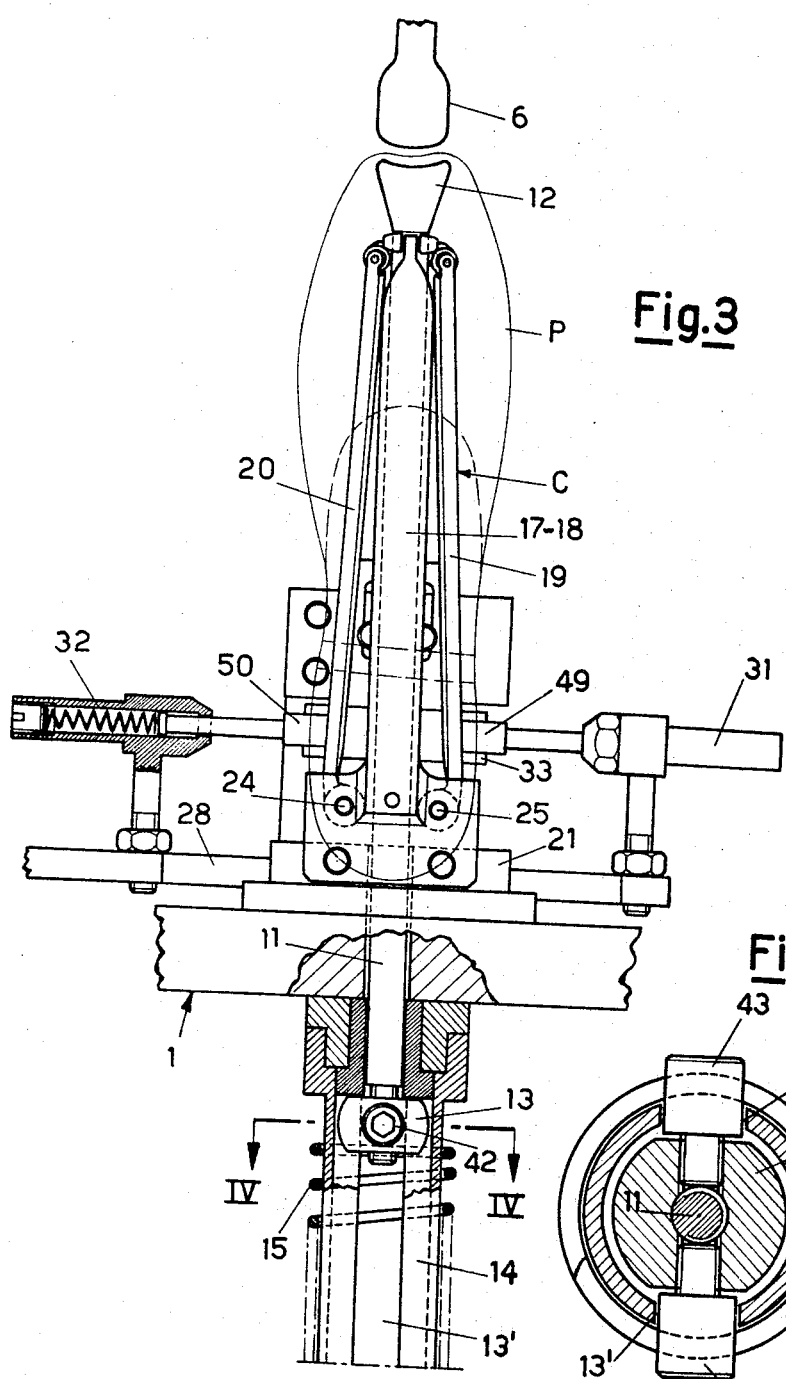

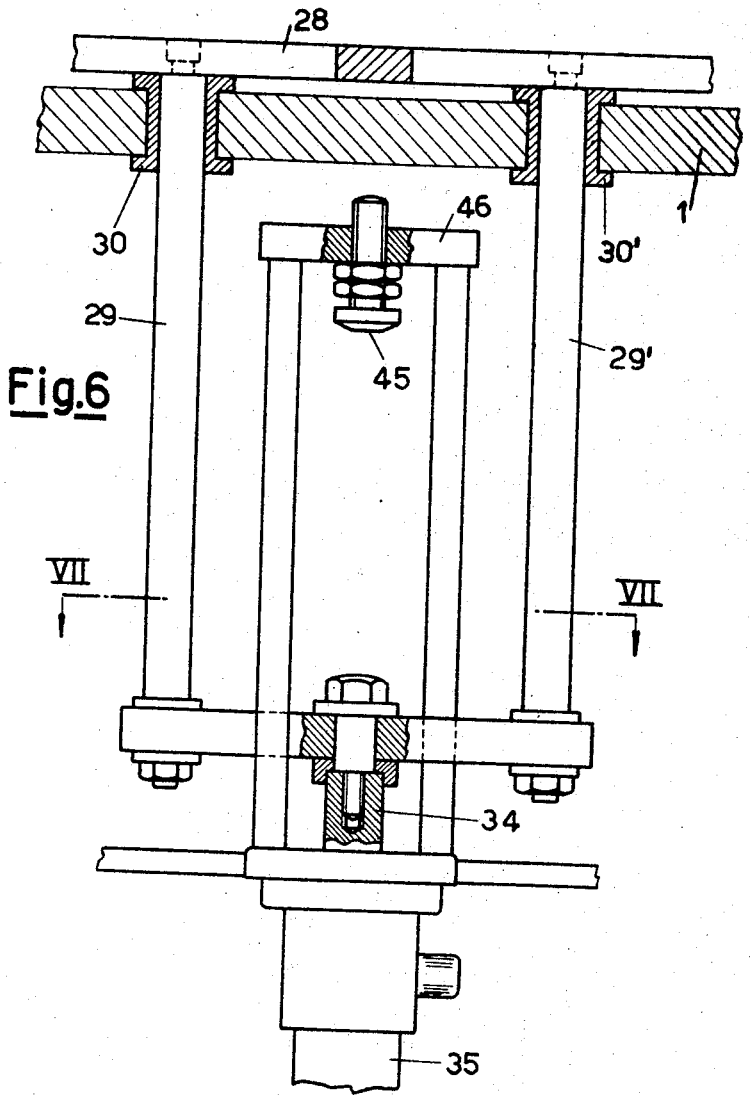
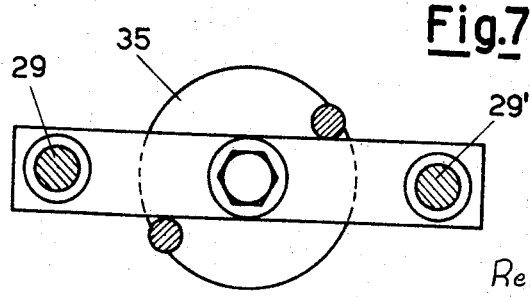

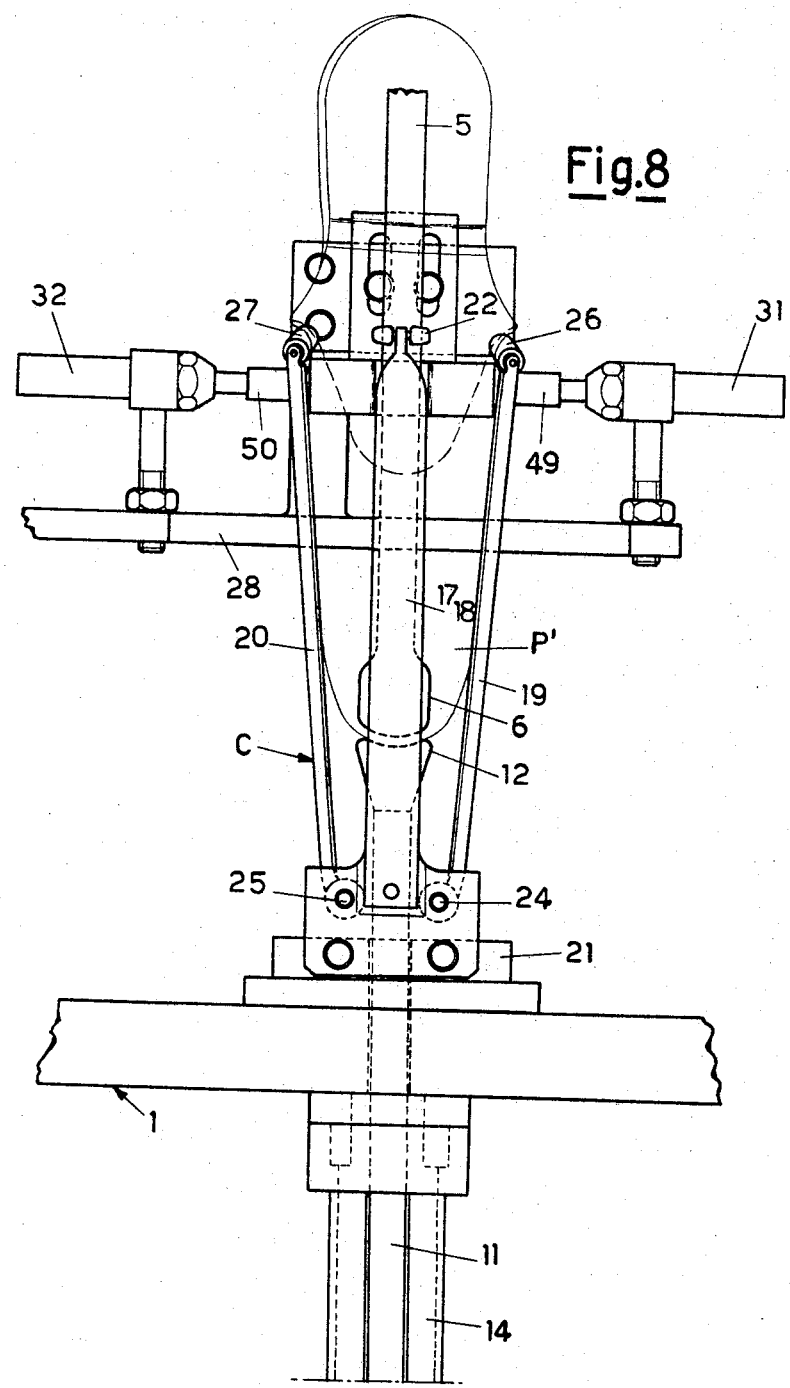

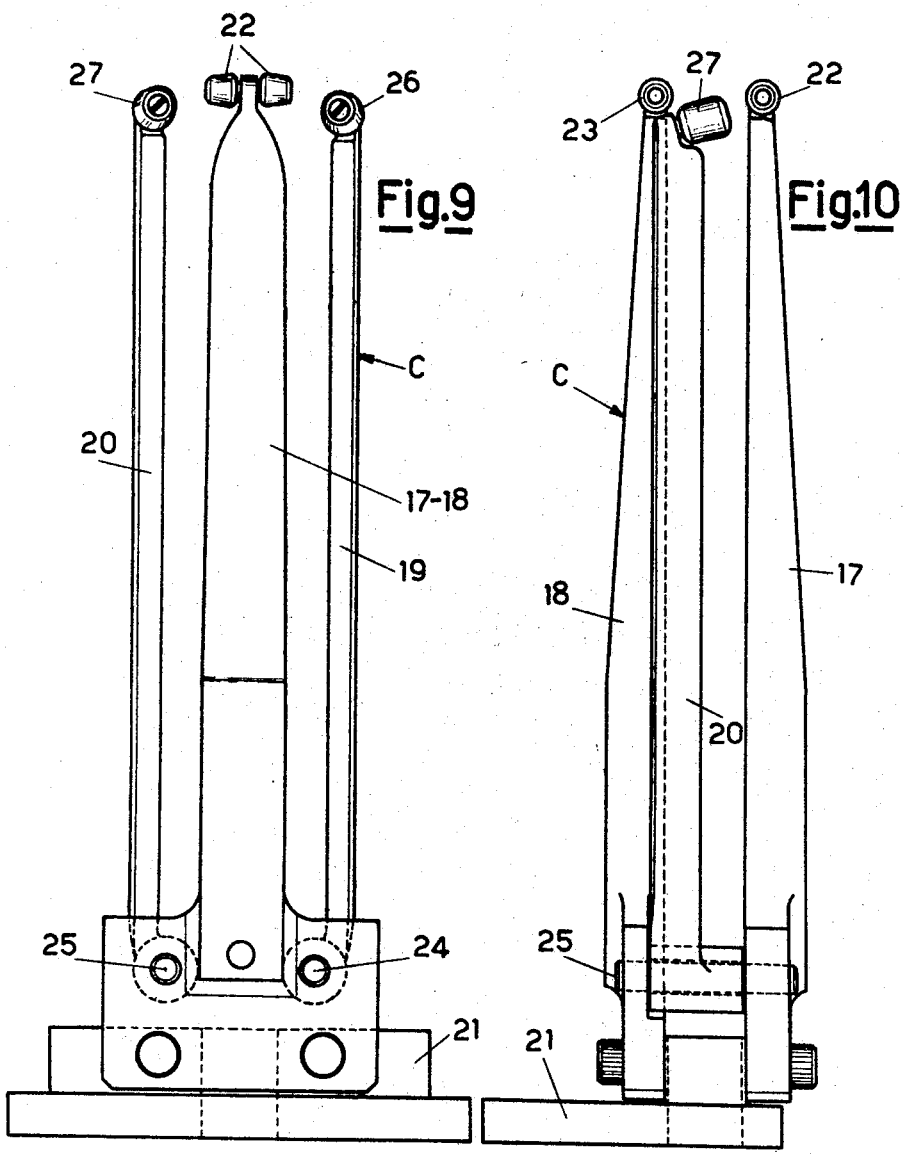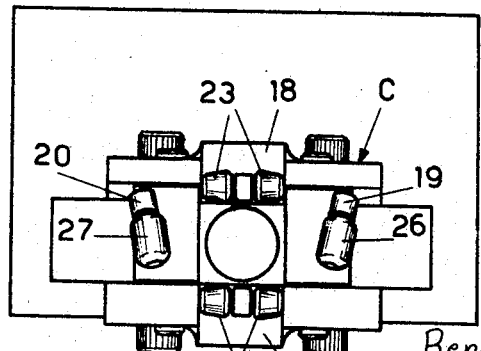

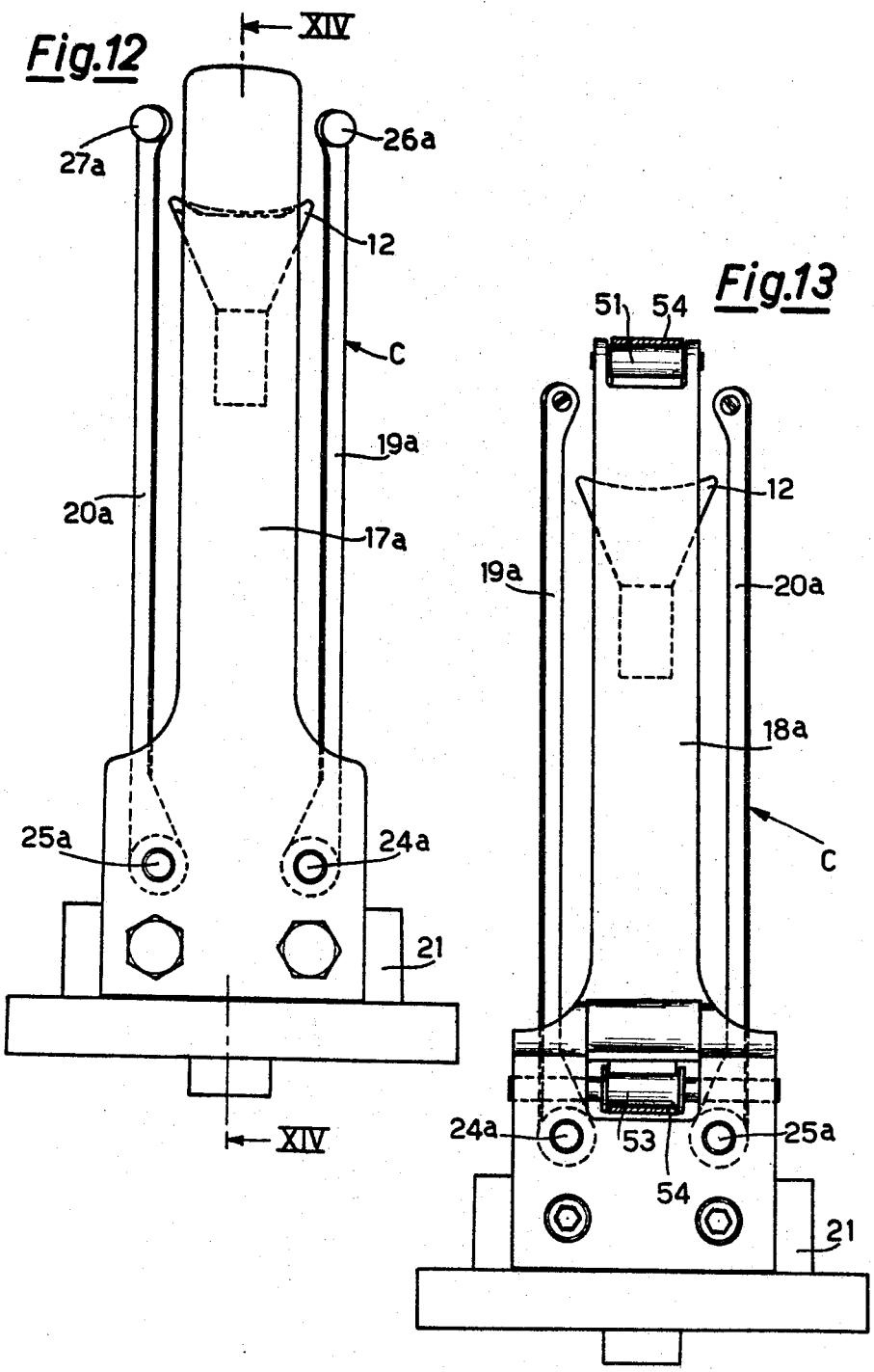

INVENTOR
Renato Crimella
BY
Stevens, Davis, Miller & Mosher
ATTORNEYS

United States Patent Office 3,328,816
Patented July 4, 1967

3,328,816
AUTOMATIC MACHINE FOR TURNING
FOOTWEAR INSIDE OUT
Renato Crimella, Via de Sanctis 33, Milan, Italy
Filed June 17, 1965, Ser. No. 464,747
Claims priority, application Italy, June 25, 1964,
729,097
5 Claims. (Cl. 12—57)

It is known that for footwear of the kind of slippers and the like, the union between the upper and the sole is made by a seam which, as the footwear article is finished, should not be visible from the outside. To this end, after having made the seam from the outside along the edge of the upper and the everted sole, it is necessary to evert the footwear article again so as to bring the seamline towards the inside thereof again. The eversion is presently a manual operation aided by tools which require notable efforts and can be handled by a few skilled craftsmen only.

An object of the present invention is to provide a machine capable of automatically everting the footwear article of the slipper kind with the attendant advantage of remarkably improving the output while lowering the cost and saving manpower.

The machine the subject of this invention is characterized by comprising, in combination and mounted on a specially provided baseplate: a die and a counterdie, movable along a common axis and capable of clamping, between them, one from the outside and the other from the inside, the tip of the footwear article to be everted; means capable of exerting an axial thrust on the die and thus also on the counterdie overcoming the reactive force of a resilient member acting upon the counterdie and tending to recall it into the starting position; a guiding and supporting member for the footwear article comprising four arms which surround the axis along which the die and the counterdie are being displaced, two of said arms being confrontingly affixed to the baseplate while the other two arms are also confrontingly mounted with respect to one another but shifted 90° apart with respect to the former arms and hingedly connected to the baseplate thus permitting to their roller-tipped free ends to be spread apart; at least two retractable pressing fingers which resiliently react against the spreading apart of the supporting arms aforesaid and simultaneously engage the upper's edge so as to assist the eversion thereof; means for displacing said pressing fingers in a direction reverted with respect to that along which the die and the counterdie are moved, and means for independently controlling the speed of displacement of the die and of the pressing fingers.

According to a preferred embodiment the die is formed by the male end portion of a rod which is adjustably connected to the piston of a hydraulic ram having a vertical axis, while the counterdie is formed by the female end portion of a rod coaxially arranged with respect to the formed rod and subjected to the reactive force of a spring which tend to recall it to its initial position as the action of the piston on the die is discontinued. In practice, in order to exploit a machine for a wide range of kinds and sizes of footwear, thus widening the utility and the field of applicability of said machine, the latter can comprise one or more working places served by a single die carried by a header which can be alternatively displaced in correspondence with either working place.

The foregoing and other features of the machine according to the invention will become more apparent from the description of an exemplary embodiment illustrated by the accompanying drawings, wherein:

FIGURES 1 and 1a which should be read together show a side elevational view of the machine.

FIGURE 2 is a plan view of the machine.

FIGURE 3 shows a detail of the guiding and supporting member and of ancilliary apparatus in the at rest position.

FIGURE 4 is a cross-sectional view taken along the line IV—IV of FIG. 3.

FIGURE 6 shows a detail of the control of the pressing-finger carrying plate.

FIGURE 7 is a cross sectional view according to the line VII—VII of FIG. 6.

FIGURE 8 shows in detail the members of the FIG. 3 in the final working position.

Figure 1A:
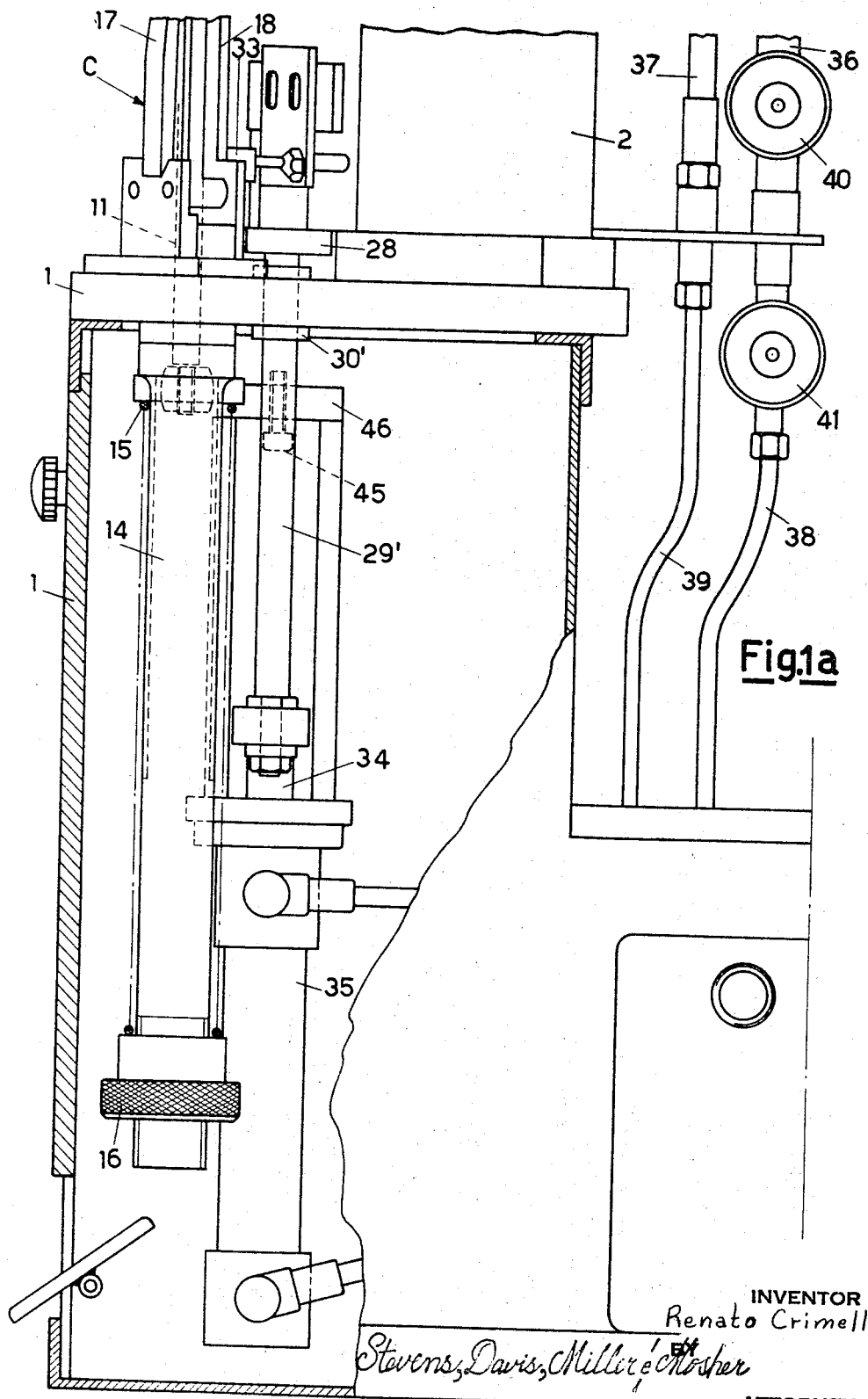
Figure 5:
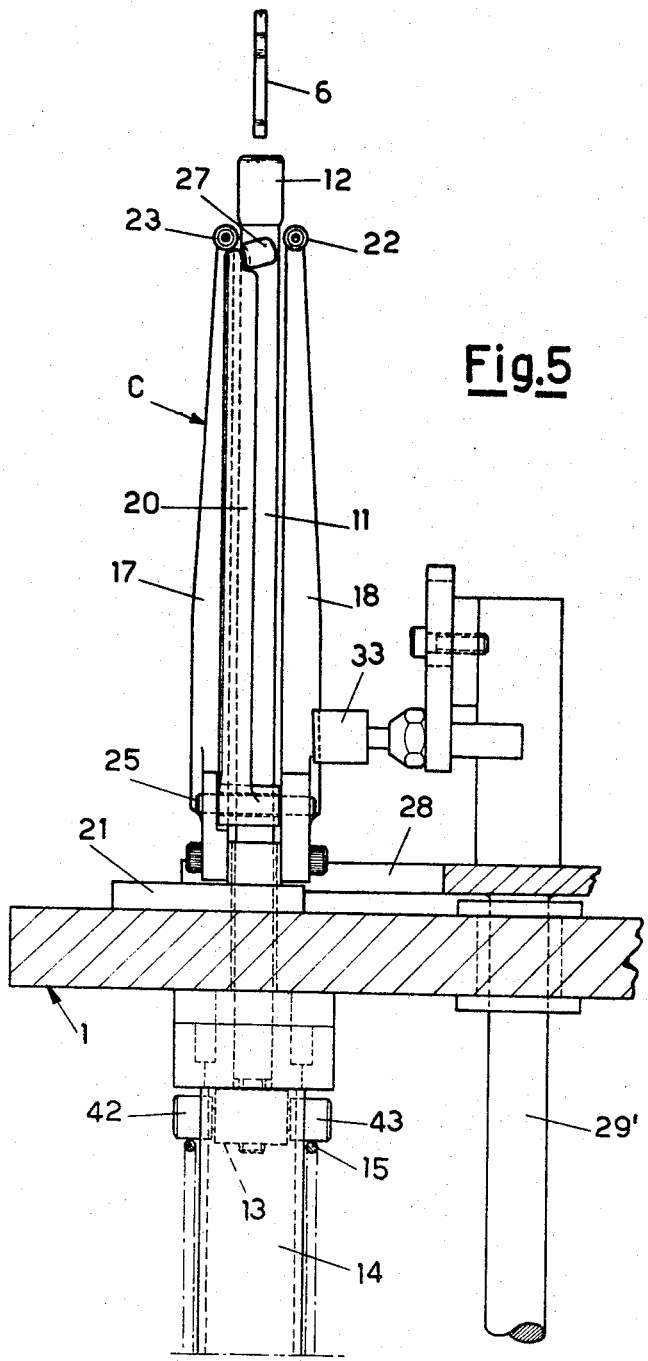
FIGURE 5 is a lateral view of the detail shown in FIG. 3.

FIGURES 9, 10, 11 show, respectively, in a front view from the inside of the machine, in lateral view and as a plan view, the supporting and guiding member, and FIGURES 12, 13, 14 and 15 show, respectively, in front view from the inside and from the outside of the machine, in cross-section along the line XIV—XIV of FIG. 12 and as a plan view, an alternative embodiment of the guiding and supporting member.

The machine illustrated by way of example only is of the kind having two working places A and B for two kinds or sizes of footwear.

On the overall frame 1 there is, rotatably mounted about the axis X—X of the fixed pillar 2, a plate 3 which supports a hydraulic ram 4 to whose piston is connected, through an adjustable joint 4', the rod 5 terminated by a shaped head 6 forming the die. The plate 3, as aforesaid, is angularly shiftable around the axis X—X by the handle 7 so that the axis of the ram 4 and thus also that of the rod 5 and of the die 6 can be brought in registry with either working places A or B. The accuracy of the displacement is assured by the dowel 8, adjustable by the spring 9, the dowel tip entering either positioning notch, 10a or 10b, formed in the fixed supporting member of the pillar 2. Two additional positioning notches 10c and 10d define two at rest positions for the plate 3.

In each of the two working places A and B is mounted a rod 11 which is upperly terminated by a shaped head 12 forming the counter die, said rod being adjustably connected in its lowermost portion to a head 13 (best seen FIGS. 3 and 4) whose adjustment pins 42–43 are displaced along slots 13' of a tubular guiding member 14, compressing a coil spring 15 wound externally of the guide 14 and adjustable by a screw-threaded sleeve 16 (FIG. 1a) to oppose the downward movement of the counterdie. The rod 11 and the counterdie 12 in each working place A and B is surrounded by a supporting and guiding member for the footwear article being processed, said guiding member being generally connoted by the letter C and consisting of four vertical arms 17–18 and 19–20.

The two confrontingly mounted arms 17 and 18 are affixed to the baseplate 21 and, in the embodiment shown in FIGS. 1 to 11, said arms 17 and 18 are fitted at their free tips with rollers 22 and 23, respectively. The other two arms 19, 20 are hingedly connected to the base 21 at 24 and at 25, respectively, and can be spread apart away of their plane; also the arms 19–20, in this embodiment, are fitted with tip-rollers 26, 27 which are rotatable about slightly slanting axes (see particularly FIGS. 9 to 11).

A horizontal plate 28 is mounted upon two pillars 29–29' guided by bushings 30–30' (see FIGS. 6 and 7). The plate 28 is vertically displaceable, said displacement being controlled by the stem 34 of the piston sliding within an underlying hydraulic ram 35.

The numeral 45 connotes an adjustable abutment mounted on a tie 46 affixed to the ram 35, and which is intended to limit the stroke of the plate 28.

Upon the plate 28 are mounted, for each working place A and B, two spring-biased pressing fingers 49–50 slidable in supporting members 31, 32 which oppose the spreading apart of the arms 19, 20 (see FIGS. 3 and 8) and, during the operation, engage with their tips the edge of the footwear's upper. On the same plate 28 is mounted, for each working place, another pressor 33, also spring-biased, which is terminated by a shaped head so as to engage a significant portion of the upper's edge comprised between the pressing fingers 49 and 50. The numerals 36 and 37 (FIGS. 1 and 1a) connote two oil pipes for the operating oil of the upper ram 4 and 38 and 39 are the oil pipings for the operating oil of the lower ram 35. The numerals 40 and 41 connote the valves which serve to adjust the working pressure of the oil in the two rams aforesaid and thereby the speed of the displacement of the respective pistons consistently with the nature of the footwear article, the resistance of the leather and so on. An oledynamic distributor (not here shown) is pedal-controlled and simultaneously controls the two rams 4 and 35.

According to an alternative embodiment shown FIGS. 12 to 15 the guiding supporting member C of the footwear article being processed, provided for in each working place, consists of four arms 17a, 18a, 19a, 20a. The arms 17a and 18a are affixed to the baseplate 21. The arm 17a is beveled at its upper end and, as contrasted to the former embodiment, has no top roller.

Figure 14:
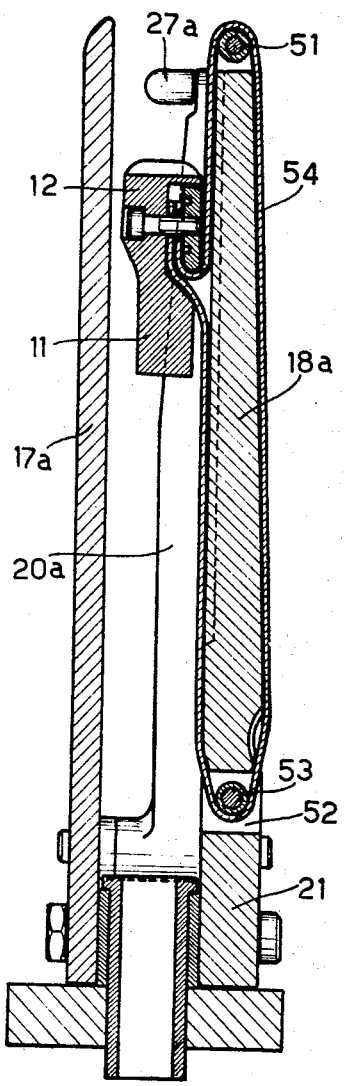
Figure 15:
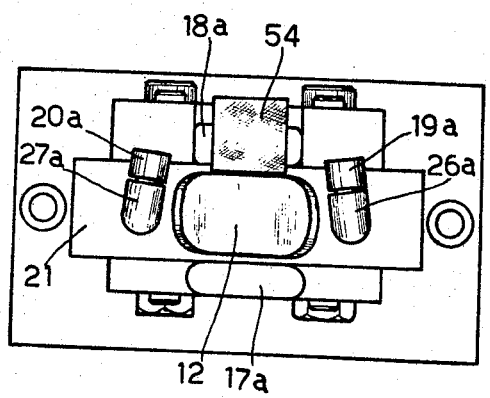

The arm 18a carries at the top a roller 51 and, at the bottom, in a slot 52, a second roller 53 (see FIGS. 13 and 14). About these two rollers 51 and 53 a belt 54 is held taut and is suitably affixed, as shown FIG. 14, to the counterdie 12.

Thus, the vertical movement of the counterdie 12 causes also the belt 54 to slide. The arms 19a and 20a, hingedly affixed to the baseplate 21 at 24a and at 25a, respectively, carry end rollers 26a and 27a, respectively, which are rotatable about axes that are substantially perpendicular to said arms. This alternative embodiment of the guiding and supporting members C has proven particularly advantageous during the operation of the machine. The machine operates as follows:

Starting from the initial position shown in FIG. 3 with the die 6 lifted and the plate 28 with its pressing fingers lowered, the slipper P to be turned inside out is arranged with its tip upwards and with the sole pointing outwardly astride the guiding and supporting member C and the counterdie 12 (see the thin outline of FIG. 3).

Pressurized oil is thereafter sent into both rams 4 and 35. The former causes the die 6 to be lowered, the tip of the slipper being consequently clamped between the die 6 and the counterdie 12, and the thusly clamped tip is caused to advance downwardly by overcoming the bias of the spring 15. As the tip of the slipper penetrates between the arms of the supporting member C and the material slides over the rollers 22, 23, 26 and 27 (or over the rollers 26a and 27a aided by the belt 54 according to the alternative embodiment shown FIGS. 12 to 15), the arms 19, 20 are spread apart and the upper's edge is caused to adhere to the outer faces of said movable arms 19, 20 and of the intermediate fixed arm 17 therebetween.

In the meantime, due to the action of the ram 35, the plate 28 and thus also the pressors 49, 50, 53 are lifted, these latter, by completing their upward stroke while engaging the upper's edge, complete the eversion of the upper by pushing it upwards and outside the support C, while the downward thrust of the die 6 on the slipper's tip is continued within said support C. The simultaneous eversion of the sole can be manually aided by the operator. The speed ratio of the die downward stroke and of the upward stroke of the pressers, as well as the magnitude of the pressures imposed thereby to the footwear article can be adjusted by manipulating the valves 40 and 41 consistently with the material the slipper is made of and with its shape and size. In general, the pressers should enter action as the slipper's tip, clamped between the die and the counterdie, has gone a few centimeters between the arms of the support C.

The thin outline in FIG. 8 indicates the end position of the everted slipper, P'. It is then enough to dump the two rams 4 and 35 to have the several members to return to their starting positions, thus allowing the removal of the everted slipper and the mounting of a fresh slipper to be turned inside out.

The machine as described herein is, of course, equipped with suitable means for the adjustment of the several operative component parts so as to put them in readiness according to the kind of footwear article to be everted, of the kind of material to be used, of the several sizes to be dealth with and so on. With a two-place machine as described it is possible to use it for a wide range of articles.

I claim:
1. A machine for turning inside out footwear articles such as slippers and the like, characterized in that it comprises, in combination: a die and a counterdie, movable along their common axis and capable of clamping between them, one from the inside and the other from the outside, the tip of the footwear article to be everted, means capable of exerting an axial thrust on the die and thus also on the counterdie overcoming the reactive force of a resilient member acting upon the counterdie and urging it into the starting position; a guiding and supporting member for the footwear article, comprising four arms which surround the axis along which the die and the counterdie are being displaced, two of said arms being confrontingly affixed to a baseplate while the other two arms are also confrontingly mounted with respect to one another but shifted 90 degrees apart with respect to the former arms and hingedly connected to the baseplate and thus capable of being spread apart; at least two retractable pressing fingers which resiliently react against the spreading apart of the supporting arms and simultaneously engage the upper's edge so as to assist the eversion thereof; and means for displacing said pressing fingers in a direction reverted with respect to that of the die and the counterdie.

2. A machine according to claim 1, characterized in that the die is formed by the shaped end of a rod adjustably connected to the piston of a hydraulic ram having a vertical axis, while the counterdie consists of the shaped end of a rod coaxial with the former and confrontingly mounted therewith and biased by said resilient members, said resilient member being an adjustable recoil spring.

3. A machine according to claim 2, characterized in that the two spring-biased pressing fingers and a third intermediate finger, all of them cooperating with the upper's edge, are mounted on a plate actuated by another hydraulic ram which acts simultaneously with, and opposedly to, the ram which actuates the die.

4. A machine according to claim 3 characterized in that the pressures imposed by the two hydraulic rams are adjustable so as to commensurate the forces to the nature and the resistance of the leather which forms the upper to be everted.

5. A machine according to claim 4, characterized in that two or more working places are prearranged thereon, served by a single die which, with its attendant hydraulic ram is mounted on a plate which is displaceable and angularly adjustable so as to bring the die, alternatively, in registry with either said places.

References Cited
UNITED STATES PATENTS 1,695,344   12/1928   Proulx _____ 12—4
2,574,680   11/1951   Willhauck _____ 223—39 X PATRICK D. LAWSON, *Primary Examiner.*